US012663765B2

(12) United States Patent
Phan et al.

(10) Patent No.: US 12,663,765 B2
(45) Date of Patent: Jun. 23, 2026

(54) PHYSICAL SYSTEM CONTROL OPTIMIZATION USING PRINCIPLE MODELS AND MACHINE LEARNING MODELS

(71) Applicant: International Business Machines Corporation, Armonk, NY (US)

(72) Inventors: Dzung Tien Phan, Pleasantville, NY (US); Vinicius Lima Silva, Philadelphia, PA (US); Jayant R. Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 18/297,385

(22) Filed: Apr. 7, 2023

(65) Prior Publication Data

US 2024/0337992 A1 Oct. 10, 2024

(51) Int. Cl.
*G05B 13/04* (2006.01)

(52) U.S. Cl.
CPC ................................. *G05B 13/042* (2013.01)

(58) Field of Classification Search
CPC ............ G06N 3/02; G05B 2219/33027; G06F 16/906
See application file for complete search history.

(56) References Cited

U.S. PATENT DOCUMENTS 7,536,364 B2 5/2009 Subbu et al.
11,443,218 B2 9/2022 Gupta et al.

| | | | |
|---|---|---|---|
| 2012/0143575 A1* | 6/2012 | Imhof | G01V 11/00 703/2 |
| 2018/0330300 A1* | 11/2018 | Runkana | G05B 15/02 |
| 2018/0357343 A1* | 12/2018 | Klenner | G06N 3/08 |
| 2021/0049467 A1* | 2/2021 | Riedmiller | G06N 3/08 |
| 2021/0150384 A1 | 5/2021 | Dasgupta et al. | |
| 2021/0334630 A1 | 10/2021 | Lambert et al. | |

(Continued)

OTHER PUBLICATIONS

Hwiberg, "GitHub—hwiberg/OptiCL: An end-to-end framework for mixed-integer optimization with data-driven learned constraints", accessed on Feb. 21, 2023, pp. 1-3, https://github.com/hwiberg/OptiCL.

(Continued)

*Primary Examiner* — Tan H Tran
(74) *Attorney, Agent, or Firm* — Yee & Associates, P.C.

(57) ABSTRACT

A computer implemented method for controlling determining an optimization solution for controlling a physical system. An optimization model is formed using an objective function and a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system. Set points are determined for the input variables for an extremum for the target value for the target variable in the optimization model using regions in which the set points result in agreement between the target value predicted by the machine learning model and the target value predicted by the first principle model. The set points form the optimization solution.

20 Claims, 12 Drawing Sheets

(56)                    References Cited

U.S. PATENT DOCUMENTS

| | | |
|---|---|---|
| 2022/0013241 A1 | 1/2022 | Meyerson et al. |
| 2022/0027685 A1 | 1/2022 | Phan et al. |
| 2022/0335308 A1 | 10/2022 | Zhou et al. |
| 2024/0103457 A1 | 3/2024 | Phan et al. |
| 2024/0217016 A1* | 7/2024 | Mondal .................. B29C 65/02 |

OTHER PUBLICATIONS

Kalagnanam et al., "AI-Based Real-Time Site-Wide Optimization for Process Manufacturing", Informs Journal on Applied Analytics, Articles in Advance, vol. 52, No. 4, 2022, pp. 1-16, https://pubsonline.informs.org/doi/abs/10.1287/inte.2022.1121.

Khalil-Research, "GitHub—khalil-research/PyEPO: A PyTorch-based End-to-End Predict-then-Optimize Library for Linear and Integer Programming", accessed on Feb. 21, 2023, pp. 1-6, https://github.com/khalil-research/PyEPO.

Peng, "Optimise your industrial performance with the IBM Plant Advisor", May 7, 2018, IBM Nordic Blog, accessed on Feb. 21, 2023, pp. 1-6, https://www.ibm.com/blogs/nordic-msp/optimise-industrial-performance-ibm-plant-advisor/.

No Author, "Regression Optimization", https://web.archive.org/web/20220515000000*/https://developer.ibm.com/apis/catalog/ai4industry--regression-optimization-product/Getting%20Started/, Oct. 17, 2022, 4 pages.

* cited by examiner

COMPUTING ENVIRONMENT
100

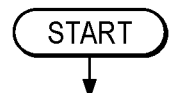

900 ~ FORM AN OPTIMIZATION MODEL USING AN OBJECTIVE FUNCTION, A SET OF CONTRAINTS, A MACHINE LEARNING MODEL THAT PREDICTS A TARGET VALUE FOR A TARGET VARIABLE FOR A PHYSICAL SYSTEM IN RESPONSE TO RECEIVING INPUTS FOR INPUT VARIABLES FOR THE PHYSICAL SYSTEM, AND A FIRST PRINCIPLE MODEL THAT PREDICTS THE TARGET VALUE FOR THE TARGET VARIABLE FOR THE PHYSICAL SYSTEM IN RESPONSE TO RECEIVING THE INPUTS FOR THE INPUT VARIABLES FOR THE PHYSICAL SYSTEM

902 ~ DETERMINE SET POINTS FOR THE INPUT VARIABLES FOR AN EXTREMUM FOR THE TARGET VALUE FOR THE TARGET VARIABLE IN THE OPTIMIZATION MODEL USING A NUMBER OF REGIONS IN WHICH THE SET POINTS RESULT IN AGREEMENT BETWEEN THE TARGET VALUE PREDICTED BY THE MACHINE LEARNING MODEL AND THE TARGET VALUE PREDICTED BY THE FIRST PRINCIPLE MODEL, WHEREIN THE SET POINTS FORM AN OPTIMIZATION SOLUTION FOR CONTROLLING THE PHYSICAL SYSTEM

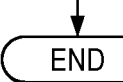

FIG. 9

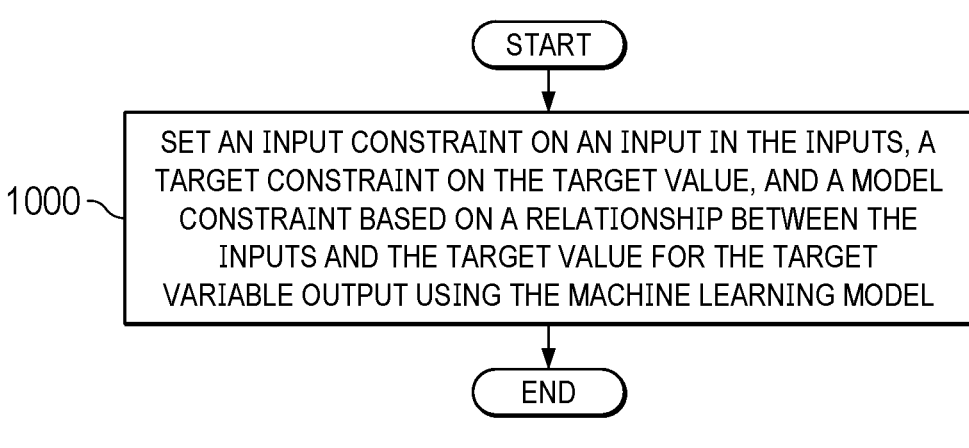

1000 ~ SET AN INPUT CONSTRAINT ON AN INPUT IN THE INPUTS, A TARGET CONSTRAINT ON THE TARGET VALUE, AND A MODEL CONSTRAINT BASED ON A RELATIONSHIP BETWEEN THE INPUTS AND THE TARGET VALUE FOR THE TARGET VARIABLE OUTPUT USING THE MACHINE LEARNING MODEL

FIG. 10

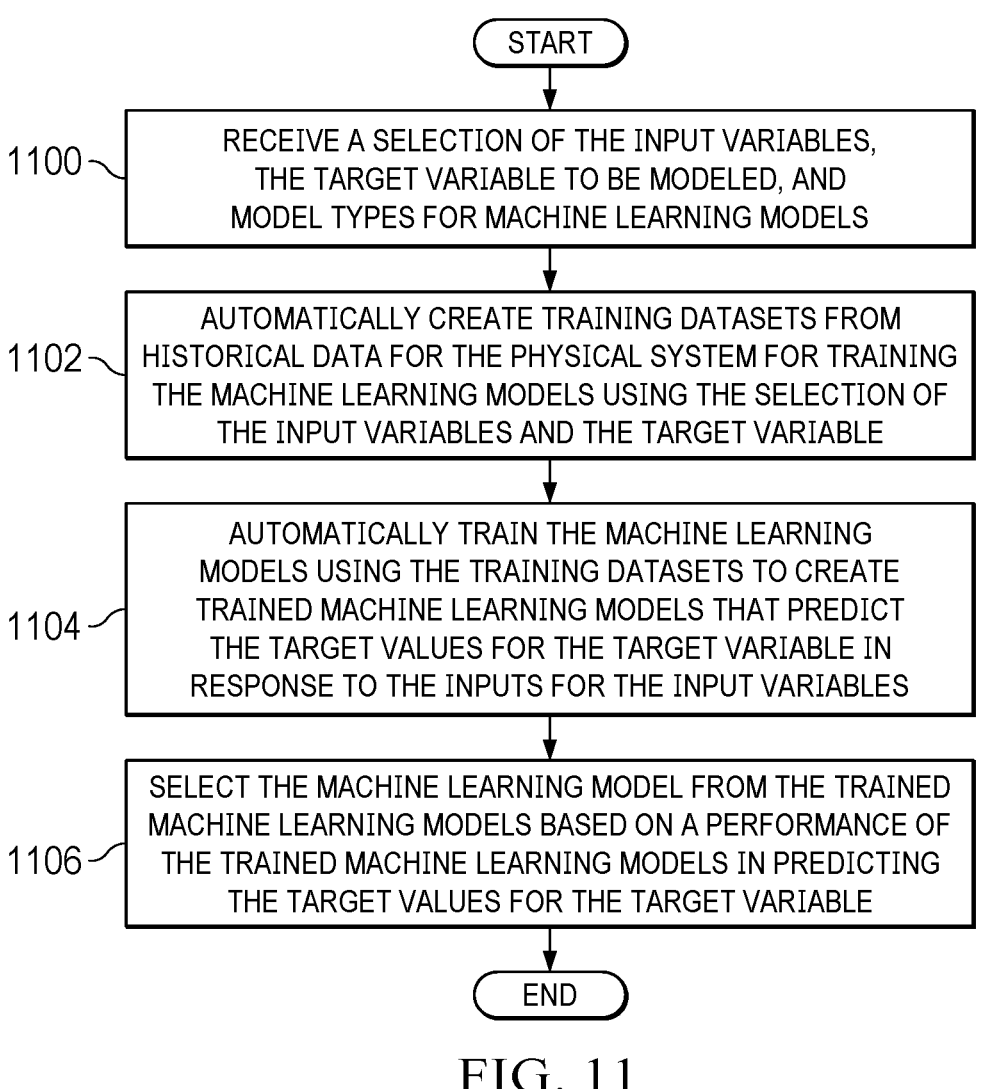

START

1100 — RECEIVE A SELECTION OF THE INPUT VARIABLES, THE TARGET VARIABLE TO BE MODELED, AND MODEL TYPES FOR MACHINE LEARNING MODELS

1102 — AUTOMATICALLY CREATE TRAINING DATASETS FROM HISTORICAL DATA FOR THE PHYSICAL SYSTEM FOR TRAINING THE MACHINE LEARNING MODELS USING THE SELECTION OF THE INPUT VARIABLES AND THE TARGET VARIABLE

1104 — AUTOMATICALLY TRAIN THE MACHINE LEARNING MODELS USING THE TRAINING DATASETS TO CREATE TRAINED MACHINE LEARNING MODELS THAT PREDICT THE TARGET VALUES FOR THE TARGET VARIABLE IN RESPONSE TO THE INPUTS FOR THE INPUT VARIABLES

1106 — SELECT THE MACHINE LEARNING MODEL FROM THE TRAINED MACHINE LEARNING MODELS BASED ON A PERFORMANCE OF THE TRAINED MACHINE LEARNING MODELS IN PREDICTING THE TARGET VALUES FOR THE TARGET VARIABLE

END

FIG. 11

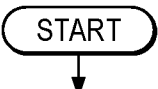

FORM THE OPTIMIZATION MODEL USING THE OBJECTIVE FUNCTION; THE MACHINE LEARNING MODEL THAT PREDICTS THE TARGET VALUE FOR THE TARGET VARIABLE FOR THE PHYSICAL SYSTEM; A SET OF ADDITIONAL MACHINE LEARNING MODELS IN WHICH EACH OF THE SET OF ADDITIONAL MACHINE LEARNING MODELS PREDICTS A PARTICULAR TARGET VALUE IN A SET OF ADDITIONAL TARGET VALUES FOR A PARTICULAR TARGET VARIABLE IN THE ADDITIONAL TARGET VARIABLES FOR THE PHYSICAL SYSTEM IN RESPONSE TO RECEIVING INPUTS FOR THE INPUT VARIABLES FOR THE PHYSICAL SYSTEM; THE FIRST PRINCIPLE MODEL THAT PREDICTS THE TARGET VALUE FOR THE TARGET VARIABLE FOR THE PHYSICAL SYSTEM; AND A SET OF ADDITIONAL FIRST PRINCIPLE MODELS IN WHICH EACH OF THE SET OF FIRST PRINCIPLE MODELS PREDICTS THE PARTICULAR TARGET VALUE IN THE SET OF ADDITIONAL TARGET VALUES FOR THE PARTICULAR TARGET VARIABLE IN THE SET OF ADDITIONAL TARGET VARIABLES FOR THE PHYSICAL SYSTEM IN RESPONSE TO RECEIVING THE INPUTS FOR THE INPUT VARIABLES FOR THE PHYSICAL SYSTEM

1200

START

END

FIG. 12

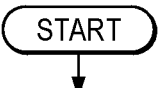

START

1300 ⟋ DETERMINE THE SET POINTS FOR THE INPUT VARIABLES FOR THE EXTREMUM FOR THE TARGET VALUE FOR THE TARGET VARIABLE IN THE OPTIMIZATION MODEL USING A NUMBER OF REGIONS IN WHICH THE SET POINTS RESULT IN AGREEMENT BETWEEN THE TARGET VALUE PREDICTED BY THE MACHINE LEARNING MODEL AND THE TARGET VALUE PREDICTED BY THE FIRST PRINCIPLE MODEL AND FOR A SET OF EXTREMUM FOR THE SET OF ADDITIONAL TARGET VALUES FOR THE SET OF ADDITIONAL TARGET VARIABLES IN THE OPTIMIZATION MODEL USING ADDITIONAL REGIONS IN WHICH THE SET POINTS RESULT IN AGREEMENT BETWEEN THE SET OF ADDITIONAL TARGET VALUES PREDICTED BY THE SET OF MACHINE LEARNING MODELS AND THE TARGET VALUES PREDICTED BY THE SET OF ADDITIONAL FIRST PRINCIPLE MODELS, WHEREIN THE SET POINTS FORM AN OPTIMIZATION SOLUTION FOR CONTROLLING THE PHYSICAL SYSTEM

END

FIG. 13

PHYSICAL SYSTEM CONTROL OPTIMIZATION USING PRINCIPLE MODELS AND MACHINE LEARNING MODELS

BACKGROUND

The disclosure relates generally to an improved computer system and more specifically to using a physics guided regression optimization using first principle models for physical systems and machine learning models for learning the objective functions and constraints to generate optimization models.

Manufacturing and industrial companies may use digital semantic representations of the physical manufacturing world. These digital representations can be for a refinery, a manufacturing plant, a production plant, a building, a supply chain network, or other systems. With the use of sensor networks having high bandwidth, large amounts of data can be gathered from these systems for use in predictive analytics and optimization. This type of analysis can provide up-to-date situation awareness and enable companies to take steps to optimize their operations.

With this type of analysis, a data-driven regression optimization can use machine learning models and optimization techniques to optimize set points for process controls for a physical system. These process controls can be for individual processes or a plantwide processes for the physical system. This optimization can be used to optimize production processes in the physical system. These production processes can be, for example, refining, manufacturing, inspection, or other processes. Production processes for companies can have complex sequences of processes.

Each of these processes can have inputs and outputs. A complex relationship can be present between various set points, material inflows, and the throughput and quality of the output. A data-driven approach can be utilized to represent complex relationships through regression modeling, serving as a surrogate model to physical or chemical models that are based on first principles. The set points can be selected for input variables that are used as inputs to influence the output of the physical system.

SUMMARY

According to one illustrative embodiment, a computer implemented method determines an optimization solution for use in controlling a physical system. A number of processor units form an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system. The number of processor units determines set points for the input variables for an extremum for the target value for the target variable in the optimization model using a number of regions in which the set points result in agreement between the target value predicted by the machine learning model and the target value predicted by the first principle model. The set points form an optimization solution for controlling the physical system.

According to other illustrative embodiments, a computer system and a computer program product for generating an optimization solution for use in controlling a physical system are provided.

BRIEF DESCRIPTION OF THE DRAWINGS

FIG. 9 is a flowchart of a process for determining an optimization solution for physical system in accordance with an illustrative embodiment;

FIG. 10 is a flowchart of a process for forming an optimization solution in accordance with an illustrative embodiment;

FIG. 11 is a flowchart of a process for training a machine learning model in accordance with an illustrative embodiment;

FIG. 12 is a flowchart of a process for forming an optimization model in accordance with an illustrative embodiment;

FIG. 13 is a flowchart of a process for determining set points in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the forego-ing. Some known types of storage devices that include these mediums include: diskette, hard disk, random access memory (RAM), read-only memory (ROM), erasable pro-grammable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electro-magnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
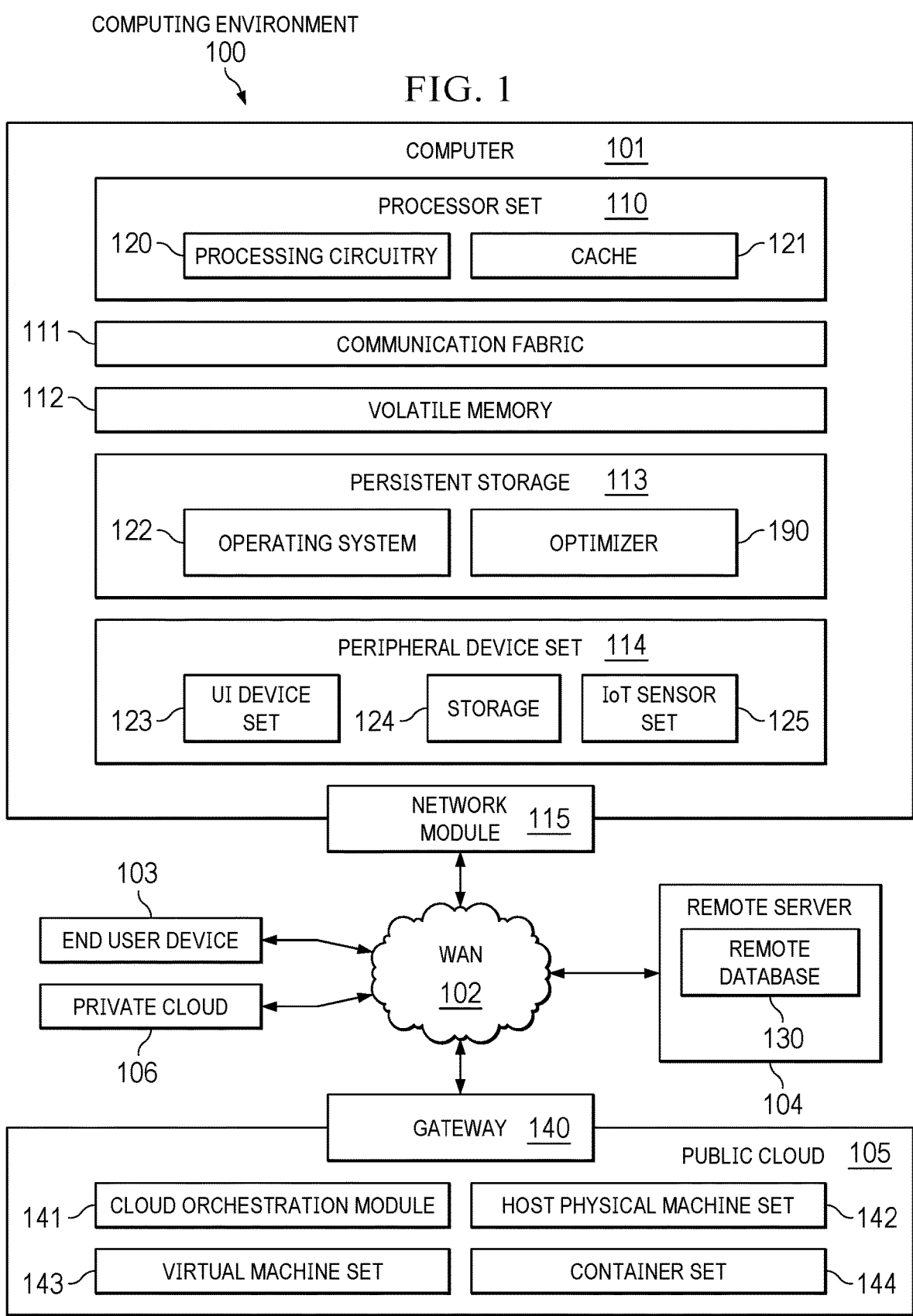
FIG. 1 is a block diagram of a computing environment in accordance with an illustrative embodiment.

With reference now to the figures in particular with reference to FIG. 1, a block diagram of a computing envi-ronment is depicted in accordance with an illustrative embodiment. Computing environment 100 contains an example of an environment for the execution of at least some of the computer code involved in performing the inventive methods, such as optimizer 190. In one or more illustrative examples, optimizer 190 can create an optimization solution comprising set points for input variables in a physical system to obtain a desired output from the physical system. In addition to optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including process-ing circuitry 120 and cache 121), communication fabric 111, volatile memory 112, persistent storage 113 (including oper-ating system 122 and optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop com-puter, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-imple-mented method may be distributed among multiple comput-ers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated inte-grated circuit chips. Processing circuitry 120 may imple-ment multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative prox-imity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth-ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in optimizer 190 in persistent storage 113.

COMMUNICATION FABRIC 111 is the signal conduc-tion path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative examples recognize and take into account a number of different considerations as described herein. For example, historical data can be used to determine optimal set points for controlling a physical system. Historical data for a physical system can include values for inputs to the physical system and an output from the physical system resulting from the inputs. These inputs are for input variables for the physical system and can also be referred to as control variables.

This historical data can be used to train a machine learning model for use in determining optimal set points for the inputs to obtain a desired target value for the target variable. In this example, the output is the value for the target variable. A machine learning model is trained using historical data can also be referred to as data driven models.

Current techniques for generating optimization solutions containing set points for the input variables to a physical system may not be as accurate as desired. In the illustrative example, an optimization model to solve an optimization problem is formed using a machine learning model that is directed towards a particular target variable. Additional machine learning models can be used for additional target variables. Further, the illustrative examples also use first principle models based on fundamental principles and laws rather than purely empirical relationships or correlations. These two types of models are used in the optimization model to determine an optimization solution comprising set points for input variables that result in output for the variable meeting the desired objective. In this example, these objectives can be maximizing or minimizing the target value for the target variable.

The illustrative examples provide a computer implemented method, an apparatus, system, and computer program product for controlling operation of a physical system. In one illustrative example a number of processor units form an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system. The number of processor units determines set points for the input variables for an extremum for the target value for the target variable in the optimization model using a number of regions in which the set points result in agreement between the target value predicted by the machine learning model and the target value predicted by the first principle model. The set points form an optimization solution for controlling the physical system. The optimization solution can be used to determine a set of control actions for controlling the physical system using the set points.

As used herein, a "number of" when used with reference to items means one or more items. For example, a number of processor units is one or more processor units. As another example, a number of regions is one or more regions. Additionally, a "set of" when used with reference to items means one or more items. For example, a set of constraints is one or more constraints.

Figure 2:
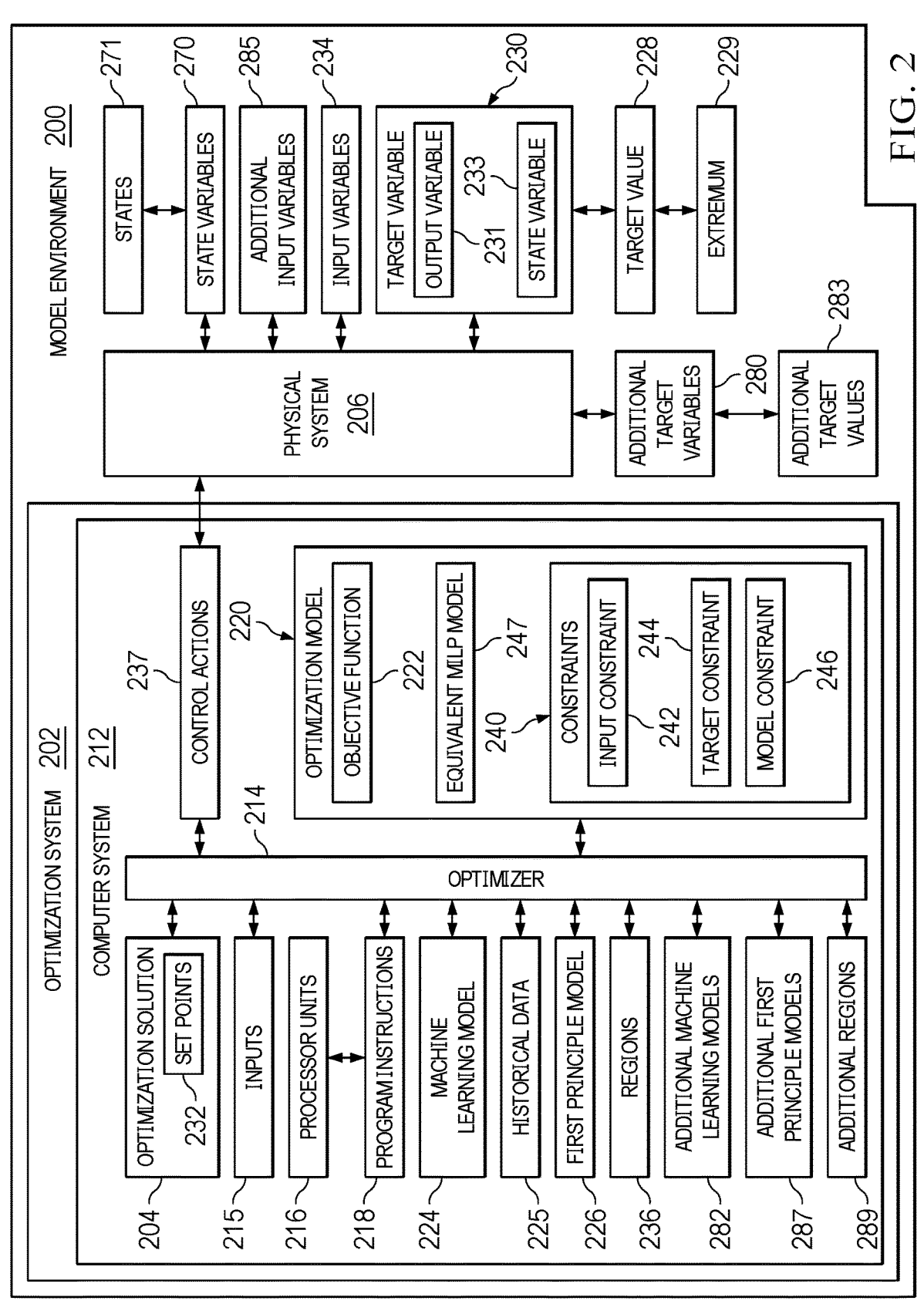
FIG. 2 is a block diagram of a model environment in accordance with an illustrative embodiment.

With reference now to FIG. 2, a block diagram of a model environment is depicted in accordance with an illustrative embodiment. In this illustrative example, model environment 200 includes components that can be implemented in hardware such as the hardware shown in computing environment 100 in FIG. 1.

In this illustrative example, optimization system 202 in model environment 200 can be used to generate optimization solution 204. This optimization solution can be used to manage physical system 206. Physical system 206 can take a number of different forms. For example, physical system 206 can be, for example, a manufacturing facility, a chip fabrication plant, a blast furnace, a chemical vapor deposition (CVD) machine, and other types of physical systems. These systems can be entire plants, systems, subsystems, or individual pieces of equipment.

As depicted, optimization system 202 comprises computer system 212 and optimizer 214. Optimizer 214 is located in computer system 212.

Optimizer 214 can be implemented in software, hardware, firmware or a combination thereof. When software is used, the operations performed by optimizer 214 can be implemented in program instructions configured to run on hardware, such as a processor unit. When firmware is used, the operations performed by optimizer 214 can be implemented in program instructions and data and stored in persistent memory to run on a processor unit. When hardware is employed, the hardware can include circuits that operate to perform the operations in optimizer 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, optimizer 214 forms optimization model 220 using objective function 222, a set of constraints 240, machine learning model 224, and first principle model 226. In this example, machine learning model 224 predicts target value 228 for target variable 230 for physical system 206 in response to receiving inputs 215 for input variables 234 for physical system 206.

Machine learning model 224 can take a number different forms. For example, machine learning model 224 can be selected from a group comprising selected from a group comprising a regression model, a random forest model, a recurrent neural network, a multilayer perceptron with a rectified linear unit (ReLU), and other suitable types of machine learning models that can be trained using historical data for physical system 206.

In this illustrative example, target variable 230 is a variable for physical system 206 that is to be controlled or optimized. For example, target variable 230 can be in output variable 231 for an output from physical system 206. Target variable 230 can also be state variable 233 for a state in states 271 for state variables 270 in physical system 206. In this example, state variables 270 are internal variables for states 271 within physical system 206. State variables 270 can be, for example, pressure, material temperature, the chemical composition of vapors, or other suitable internal types of states 271 for physical system 206.

First principle model 226 predicts target value 228 for target variable for physical system 206 in response to receiving inputs 215 for input variables 234 for physical system 206. First principle model 226 models at least one of the physical operation or chemical operation of physical system 206 to predict an output represented by output variable 231.

In this illustrative example, target variable 230 can take a number different forms. For example, when target variable 230 is output variable 231, this variable can be a production rate, a quality level, a permeability, a hydrogen efficiency, a flame temperature, a blast loss, a defect rate, and other output from physical system 206. When target variable 230 is state variable 233 this variable represents a state for within physical system 206 and is not input or output of physical system 206 in these examples. For example, state variable 233 can be one of heat loss, a composition of gases within physical system 206, a concentration of species during processing, composition of intermediate materials prior to a final output material, gases generated in physical system 206, energy distribution within physical system 206, the physical condition of the equipment, and other types of states that can be present in physical system 206.

Input variables 234 are control variables that can be controlled or adjusted to cause changes to target value 228 for target variable 230. Input variables 234 can include at least one of a temperature, temperature, a composition of a raw material, a voltage, a pressure, a moisture level, a metallic load, a quantity of input material, a processing time, or other variables that can be controlled to cause changes to target value 228 for target variable 230.

In this illustrative example, machine learning model 224 is a data driven model trained using historical data 225 for physical system 206. First principle model 226 is a mathematical model based on at least one of fundamental laws and principles such as physics laws and principles and chemical laws and principles.

The set of constraints 240 can take a number of different forms. For example, the set of constraints 240 can be selected from at least one of constraints on at least one of input constraint 242 on an input in the inputs, target constraint 244 on target value 228, and model constraint 246 based on a relationship between inputs 215 and target value 228 for target variable 230 output using the machine learning model.

In this illustrative example, input constraint 242 can be a constraint on the value that an input can take or an input variable. For example, input constraint can be for an input in the form of voltage. The constraint can be that the voltage input to physical system 206 is in a range from 100 V to 110 V.

Target constraint 244 is a constraint on target value 228 for target variable 230. This constraint can be a desired value or range for target value 228. For example, the desired range for throughput can be, for example, 4 tons to 6 tons of final product on a daily basis. In other words, target constraint 244 can be used to target value 228 to a desired value or range of values when optimization model 220 is processed to obtain optimization solution 204.

Further, model constraint 246 in constraints 240 is based on a relationship between input variables 234 and target variable 230. In other words, the relationship between input variables 234 and target variable 230 can be taken into account using model constraint 246. In this example, machine learning model 224 is trained to predict target value 228 for target variable 230 in response to varying values for inputs 215 for input variables 234. This relationship is included in optimization model 220 for use in determining extremum 229 for objective function 222.

Thus, the effects of constraints 240 on values for input variables 234 and target variable 230 can also take into account the relationship between these variables using machine learning model 224. As result, the determination of set points 232 for optimization solution 204 can be performed more accurately and with less time taking into account model constraint 246.

Additionally, optimization model 220 can include equivalent mixed integer linear programming (MILP) model 247 created using machine learning model 224. This type of model is a mathematical representation of machine learning model 224 that can be used in optimization model 220 with objective function 222 to determine an extremum for target value 228. This type of representation of machine learning model 224 can enable solution of the optimization problem represented by optimization model 220 using MILP solvers, which are tools that can be used to solve optimization problems. In this manner, optimization model 220 is an optimization problem that can be a mixed integer linear program solved with currently available optimization solvers that can find the solution to the optimization in optimization model 220.

In solving for the optimization problem, optimizer 214 can automatically load machine learning models, construct the mixed integer linear representation of the machine learning models, and construct a finite horizon optimization problem for using optimization model 220 in one illustrative example. This finite horizon optimization problem is a type of optimization problem where the objective is to find the optimal solution for a finite period of time subject to constraints. This period of time can be divided into discrete time steps. Values for input variables are selected for each of these time periods.

Optimizer 214 determines set points 232 for input variables 234 for extremum 229 for target value 228 for target variable 230 in optimization model 220 using a number of regions 236 in which set points 232 result in agreement between target value 228 predicted by machine learning model 224 and target value 228 predicted by first principle model 226. The number of regions 236 can be considered a constraint to set points 232 selected in optimization model 220 to form optimization solution 204. In this example, identifying extremum 229 for target value 228 using set points 232 that fall within regions 236 can form optimization solution 204.

In this illustrative example, set points 232 are values for inputs 215 for machine learning model 224 that results in target variable 230 having target value 228 that is optimized. In other words, set points 232 are particular values for inputs 215 for machine learning model 224 that result in target value 228 having a desired value or range of values.

In this illustrative example, extremum 229 can take a number of different forms. For example, extremum 229 can be a maximization or a minimization depending on the objective is selected for target variable 230 in objective function 222. In this example, set points 232 form optimization solution 204. This optimization solution can be used to control physical system 206 to cause target value 228 for target variable 230 move towards or reach a desired value. In this illustrative example, the desired value or range of values for target value 228 can be set using target constraint 244.

Optimizer 214 can generate a set of control actions 237 for controlling the physical system using set points 232 in optimization solution 204. Control actions 237 can take a number different forms. For example, control actions 237 can include at least one of changing, adjusting, maintaining, or other action for at least one of a temperature, a composition of a raw material, a voltage, a pressure, a moisture level, a metallic load, a quantity of input material, a processing time, or other suitable actions that can be performed using set points 232 for input variables 234.

These actions can be performed to cause target value 228 for target variable 230 for physical system 206 to move towards the desired value for range of values. This desired value or range of values can be set using target constraint 244 to obtain set points 232 that result in physical system 206 outputting target value 228 for target variable 230 within the desired value or range of values.

In the illustrative example, the use of optimizer 214 in computer system 212 integrates processes into a practical application for determining set points 232 to control physical system 206. In other words, optimizer 214 in computer system 212 is directed to a practical application of processes integrated into optimizer 214 in computer system 212 that determine an optimization solution to control the operation of physical system 206 through control actions 237 using set points 232.

Thus, in illustrative examples, the optimization solution can be determined using an objective function, and machine learning model, and a first principle model. In this example, the machine learning model in the first principle model can be used to determine regions in which agreement is between predictions for set points. These regions can be used as constraints in optimizing the objective function to determine the set points that provide for optimization of the target value for the target variable for which optimization is being performed. This process can be performed for multiple target variables through the use of additional machine learning models and first principle models for those target variables. Additionally, the optimization model also includes a model constraint that is based on the relationship between the set points and the target values for the target variable using the machine learning model.

Computer system 212 can be configured to perform at least one of the steps, operations, or actions described in the different illustrative examples using software, hardware, firmware or a combination thereof. As a result, computer system 212 operates as a special purpose computer system in which optimizer 214 in computer system 212 enables determining optimization with increased accuracy as compared to current techniques. In particular, optimizer 214 transforms computer system 212 into a special purpose computer system as compared to currently available general computer systems that do not have optimizer 214.

Figure 3:
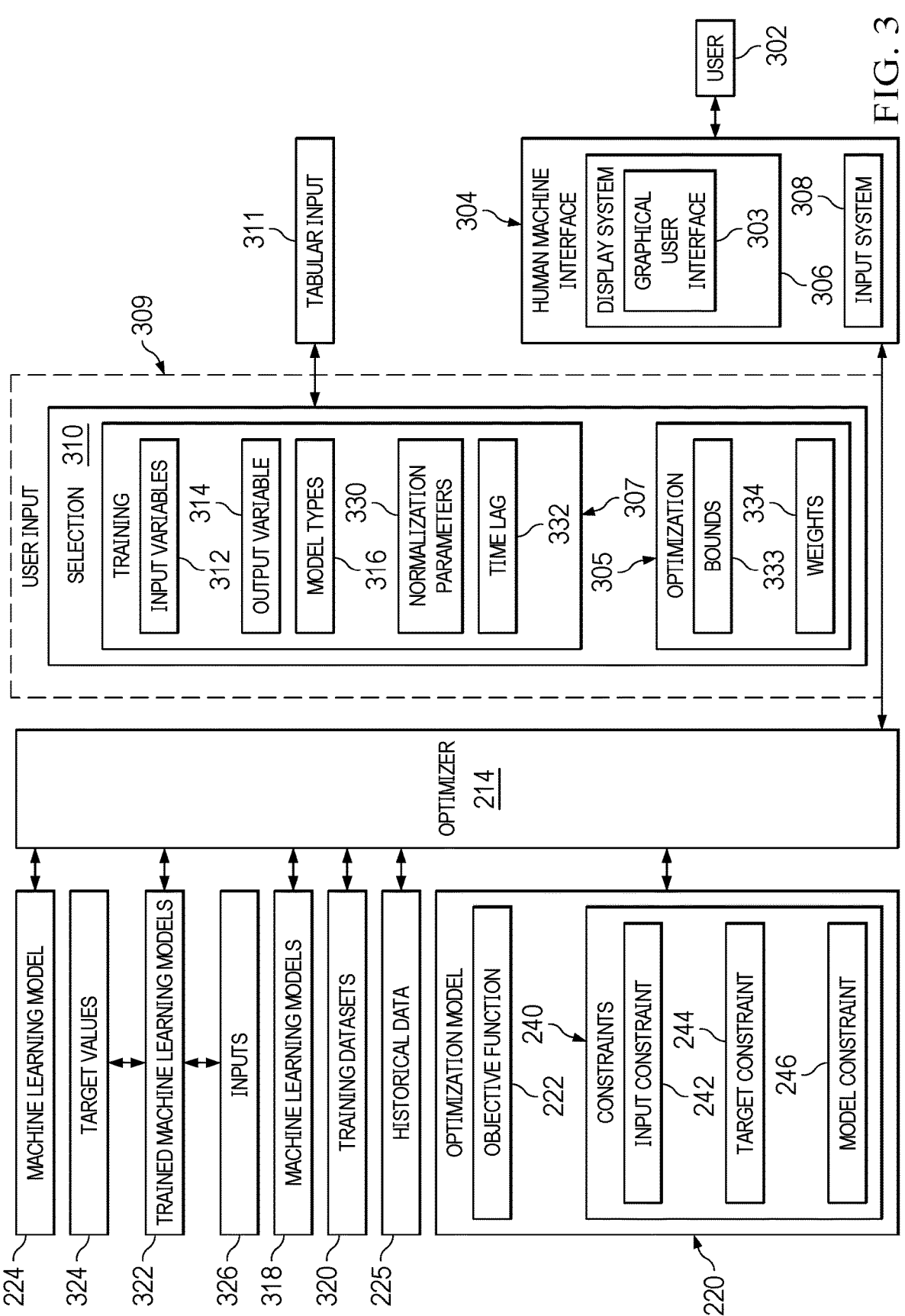
FIG. 3 is a dataflow diagram for automatically training a machine learning model and optimizing an optimization model in accordance with an illustrative embodiment.

The illustration of model environment 200 in the different components in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In this illustrative example, optimizer 214 is described as generating optimization solution 204 with set points 232 for target variable 230 in physical system 206. These steps can also be performed for physical system 206 having a number of additional target variables 280 in additional target variables 280. With the number of additional target variables 280, optimization model 220 can include these additional target variables 280 and additional input variables 285 for the number of additional target variables 280 in objective function 222. In this example, a number of additional machine learning models 282 and a number of additional first principle models 287 can be generated to predict a number of additional target values 283 for the number of additional target variables 280.

In this example, each of additional machine learning models 282 predicts a target value in additional target values 283. In other words, each machine learning model is trained to predict a particular target value. Further, a machine learning model can be trained to predict the same target value for the different time step or lag. In addition to predicting target values for different target variables, the different machine learning models can also use different input variables.

Thus, in other illustrative examples optimizer 214 can generate optimization solution 204 with set points 232 that can be used for setting or controlling inputs 215 to input variables 234 and a number of additional input variables 285 to control target value 228 and the number of additional target values 283 for physical system 206. For example, target variable 230 can be throughput in manufacturing a product and the number of additional target values 283 can be a quality level the product. Both of these values can be maximized using optimization model 220. In one illustrative example, input variables 234 for an additional input variables 285 can be 70 input variables and target variable 230 and the number of additional target variables 280 can be 8 output variables for physical system 206. These target variables can be outputs or states of physical system 206 for which optimization is desired.

With the use of additional machine learning models 282 and additional first principle models 287 for predicting additional target values 283 for additional target variables 280, additional regions 289 are determined. In other words, each additional machine learning model and additional first principle model for a particular target variable has additional regions 289. The additional regions between different additional machine learning models in different additional first principle models can be different depending on agreement between the prediction of target values by these models. In other words, additional regions 289 can be different for different additional target values based on the agreement in prediction is made for those different target values in response to inputs 215 to the models.

In one illustrative example, optimization model 220 can be represented as follows:

$$\min_{a_t,\ldots,a_{t+T-1}} \sum_{\tau=t}^{t+T-1} \phi(r_\tau) \text{ subject to } s_{t+1} = f(s_\tau a_\tau: \tau = t - w_f, \ldots, t)$$

$$r_t^{R_i} = g^{(i)}(s_\tau^{S_i}, a_\tau^{A_i}: \tau = t - w_i, \ldots, t), i = 1, \ldots, n \underline{r} \le r_\tau \le \bar{r}, \tau = t, \ldots, T,$$

$$\underline{r} \le r_\tau \le \bar{r}, \tau = t, \ldots, T,$$

$$\underline{r} \le r_\tau \le \bar{r}, \tau = t, \ldots, T,$$

$$\underline{r} \le r_\tau \le \bar{r}, \tau = t, \ldots, T,$$

$$\underline{a} \le a_\tau \le \bar{a}, \tau = t, \ldots, T,$$

$$\underline{s} \le s_\tau \le \bar{s}, \tau = t, \ldots, T, \min_{a_t,\ldots,a_{t+T-1}} \sum_{\tau=t}^{t+T-1} \phi(r_\tau)$$

$$\text{where } \underline{s} \le s_\tau \le \bar{s}, \tau = t, \ldots, T, \min_{a_t,\ldots,a_{t+T-1}} \sum_{\tau=t}^{t+T-1} \phi(r_\tau)$$

$$\underline{s} \le s_\tau \le \bar{s}, \tau = t, \ldots, T, \min_{a_t,\ldots,a_{t+T-1}} \sum_{\tau=t}^{t+T-1} \phi(r_\tau)$$

is the objective function; $\tau$ is an index variable; $r_\tau$ are the target variables; $a_\tau$ are the control variables; $s_\tau$ are state variables; $s_{t+1}$ is the predicted next state given the current state $s_t$ and a model constraint in which $f(s_\tau, a_\tau$: $\tau=t-w_f, \ldots, t)$ is the prediction of the state variable $s_{t+1}$ made using a machine learning model based on the current and previous state variables $s_\tau$ and control variables $a_\tau$, $$g^{(i)}(s_\tau^{s_i}, a_\tau^{A_i}:\tau = t - w_i, \ldots, t), i = 1, \ldots, n$$

is the prediction made using another the machine learning model based on $s_\tau$ and $a_\tau$, $w_i$ is the memory window to predict target variables $$r_t^{R_i}; \underline{r}$$

and $\bar{r}$ are lower and upper bounds for target variables; $\underline{a}$ and $\bar{a}$ are lower and upper bounds for control variables $a_\tau$, and $\underline{s}$ and $\bar{s}$ are lower and upper bounds for the state variable; $w_f$ is the memory window to predict state variables $s_{t+1}$; $S_i$ and $A_i$ are indices for subsets of the state variables $$s_\tau^{s_i}$$

and control variables $$a_\tau^{A_i}$$

used to predict a subset of target variables $$r_t^{R_i}$$

with the index set to $R_i$ in $g^{(i)}$. For predicting the next state variable $s_{t+1}$, all state variables $s_\tau$ and all control variables $a_\tau$ are used. T is the scheduling horizon.

Turning next to FIG. 3, a dataflow diagram for automatically training a machine learning model and optimizing an optimization model is depicted in accordance with an illustrative embodiment. In the illustrative examples, the same reference numeral may be used in more than one figure. This reuse of a reference numeral in different figures represents the same element in the different figures.

In this illustrative example, optimizer 214 can automatically train machine learning model 224 for use in determining set points 232 for optimization solution 204. In one illustrative example, this dataflow can enable user 302 to initiate training of machine learning model 224 without needing specific knowledge training machine learning models. In this illustrative example, user 302 can interact with optimizer 214 using human machine interface 304. Human machine interface (HMI) 304 comprises display system 306 and input system 308.

As depicted, display system 306 is a physical hardware system and includes one or more display devices on which graphical user interface 303 can be displayed. The display devices can include at least one of a light emitting diode (LED) display, an organic light emitting diode (OLED)

display, a computer monitor, a projector, a flat panel display, a heads-up display (HUD), a head-mounted display (HMD), smart glasses, augmented reality glasses, or some other suitable device that can output information for the visual presentation of information.

User 302 is a person that can interact with graphical user interface 303 through user input 309 generated by input system 308. Input system 308 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In this illustrative example, user 302 can initiate automatic training of machine learning model 224 by generating selection 310 for user input 309 that is sent to optimizer 214. As depicted, selection 310 can include items for training 307 and optimization 305. These items in selection 310 can be used to automate the training process to generate machine learning model 224 and the optimization process for generating optimization solution 204 in FIG. 2.

In this illustrative example, selection 310 can include input variables 312, target variable 314 to be modeled, model types 316 and other suitable information that can be used by optimizer 214 automatically train machine learning models 318. In this example, selection 310 in user input 309 can be tabular input 311.

In other illustrative examples, selection 310 can include other selections in addition to input variables 312, target variable 314, and model types 316. For example, selection 310 can also include normalization parameters 330, and time lag 332.

Normalization parameters 330 identify types of normalization of historical data 225 that is needed by machine learning models 318. In other words, normalization parameters 330 can identify the type processing of historical data 225 needed to create training datasets 320 for training machine learning models 318. Normalization parameters 330 can also identify normalization of target values for target variable 314 that are generated by machine learning models 318.

In this example, time lag 332 can identify a time horizon where the input variables are correlated with the target variable. Time lag 332 can be defined using a memory window indicates how far into the past data should be used from historical data 225 for creating training datasets 320 to predict target variable 314. In this example, the memory window is determined by the number of time periods in the training datasets.

In response to receiving selection 310 in user input 309, optimizer 214 automatically creates training datasets 320 from historical data 225 for physical system 206 for training machine learning models 318 using selection 310 of input variables 312 and target variable 314. Optimizer 214 automatically trains machine learning models 318 using training datasets 320 to create trained machine learning models 322 that predict target values 324 for target variable 314 in response to inputs 326 for input variables 312.

This process of creating training datasets and training machine learning models 318 is performed for a target variable. When multiple target variables are present, this process is performed for each one of the target variables.

Further, in this illustrative example, selection 310 can also include information used for automating the creation and optimizing of objective function 222 in optimization model 220. For example, selection 310 can include bounds 333 and weights 334. These selections can be used in automatically creating optimization model 220 and optimizing objective function 222 and optimization model 220.

For example, bounds 333 can be used to determine the range of values for decision variables that are to be controlled. These decision variables can be, for example, state variables, inputs variables, and target variables. Bounds 333 can have an upper value at a lower value defining a range of values for a particular value such as a target variable. Further, when states are included, bounds 333 can indicate the range of values for a particular state in performing optimization use in optimization model 220. As a result, bounds 333 can be used to define at least one of input constraint 242 or target constraint 244 in constraints 240 for use in optimizing objective function 222.

In this example, weights 334 can identify the type of objective that each target variable has when more than one target variable is present. For example, each target variable for which optimization is to be performed can be associated with a weight that indicates the type of extremum 229 for optimization and the weight the weight of that optimization with respect to other optimizations of target variables.

For example, a negative value for a weight in weights 334 can indicate that extremum 229 should be to minimize the target variable. The positive value for a weight in weights 334 can indicate that extremum 229 is to be maximized. Further, the value of the weight can also be used to give importance of a particular target variable with respect to other target variables for optimizer 214 to perform performing optimization using optimization model 220. As a result, weights 334 can be used to define the overall optimization objective for the objectives selected for the different target variables in the optimization model.

Additionally, weights 334 can determine an extremum different types of target values. For example, weights 334 can be used for at least one of an output variable or a state variable.

In this illustrative example, optimizer 214 selects machine learning model 224 from trained machine learning models 322 based on a performance of trained machine learning models 322 in predicting target values 324 for target variable 314.

Figure 4:
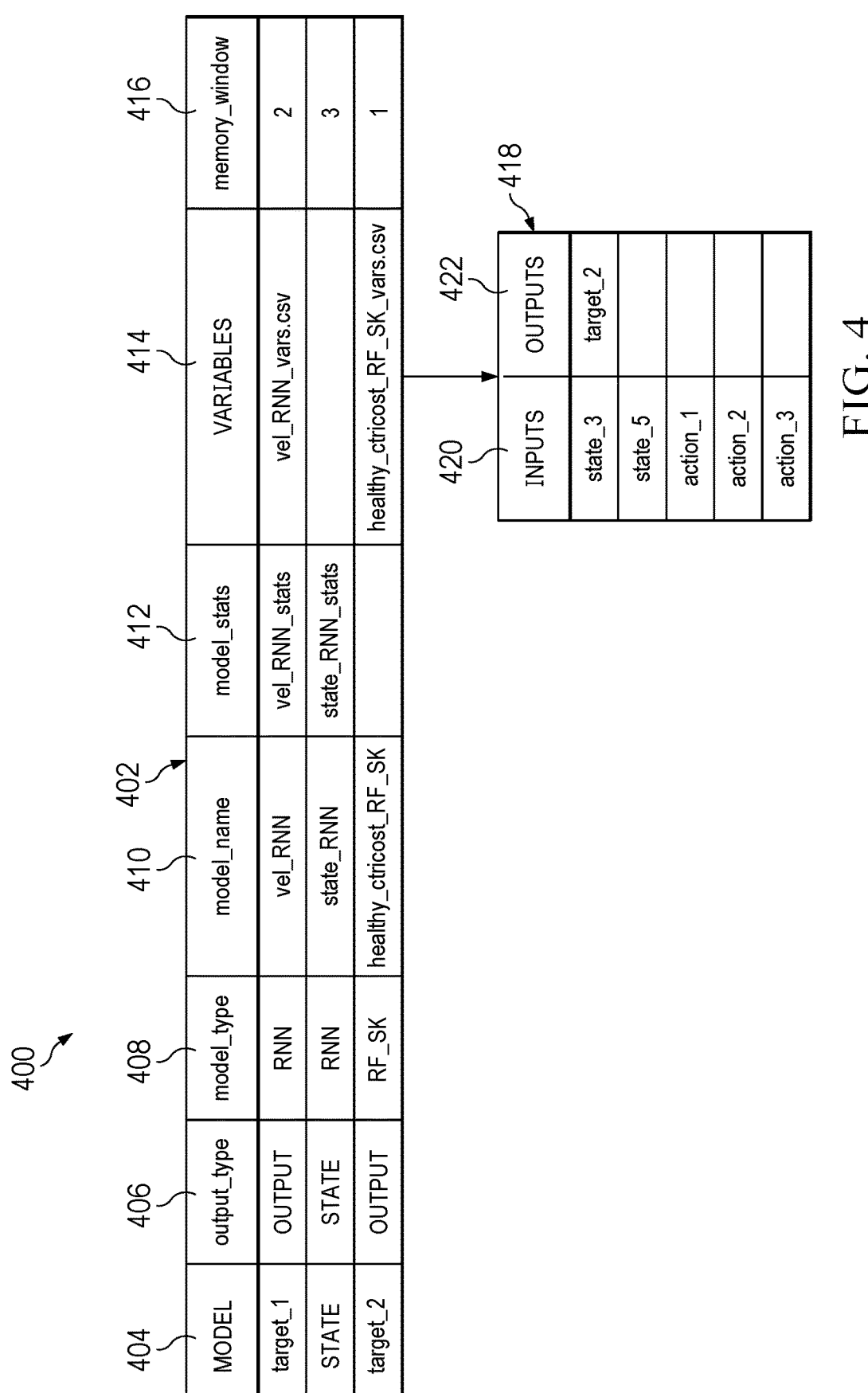
FIG. 4 is an illustration of tabular data used for automatically training machine learning models in accordance with an illustrative embodiment.

Turning next to FIG. 4, an illustration of tabular data used for automatically training machine learning models is depicted in accordance with an illustrative embodiment. In this illustrative example, tabular data 400 is an example of tabular input 311 that can be used for selection 310 to automatically train machine learning models 318 in FIG. 3.

As depicted, tabular data 400 comprises table 402 having columns for model 404, output type 406, model type 408, model name 410, model stats 412, variables 414, and memory window 416. Model 404 identifies the variable that is to be predicted by the machine learning model. Output type 406 identifies the type of variable being modeled in table 402. In other words, output type 406 identifies the output from the machine learning model. The output type in this example can be a target variable such as an output variable or a state variable for the physical system.

In this example, model type 408 identifies the type of machine learning model that is to be trained. For example, RNN is recurrent neural network and RF_S type of random forest model. Model name 410 identifies the machine learning model that is to be used. Model stats 412 identifies the characteristics of inputs to the machine learning model.

In the illustrative example, variables 414 identifies the variables that are to be used in modeling or predicting the variable identified for modeling in model 404. By the machine learning model. These variables can be, for example, input variables and state variables. In this example, variables 414 is the name of the file containing variables for which data is to be identified to train the machine learning model. Memory window 416 identifies a number of previous time steps for observations that are used as input to the machine learning model for predicting the variable identified for modeling at a future point in time.

For example, table 418 identifies the variables for which data is to be used to train the machine learning model. In this example, the column labeled inputs 420 identifies the variables that are to be used in training the machine learning model to predict the variables in outputs 422. In this example, table 418 is located in a file called "health_controlcost_RF_SK-vars.csv"

As depicted, the inputs are for variables state_3, state_5, action_1, action_2, and action 3. The output for the variable to be modeled is target__2. In this example, state_3 and state_5 are state variables and action_1, action_2, and action 3 are input variables. The identification of these variables can be used to select historical data for use in creating a training dataset to train the machine learning model.

This information in table 402 enables the optimizer to automatically select the machine learning model and identify variables in historical data for use in training machine learning model. Further, the information also includes any information about preprocessing of historical data for input into the machine learning model as well as a memory window for previous steps to be used in enabling the machine learning model to make predictions about future steps.

Figures 5, 6:
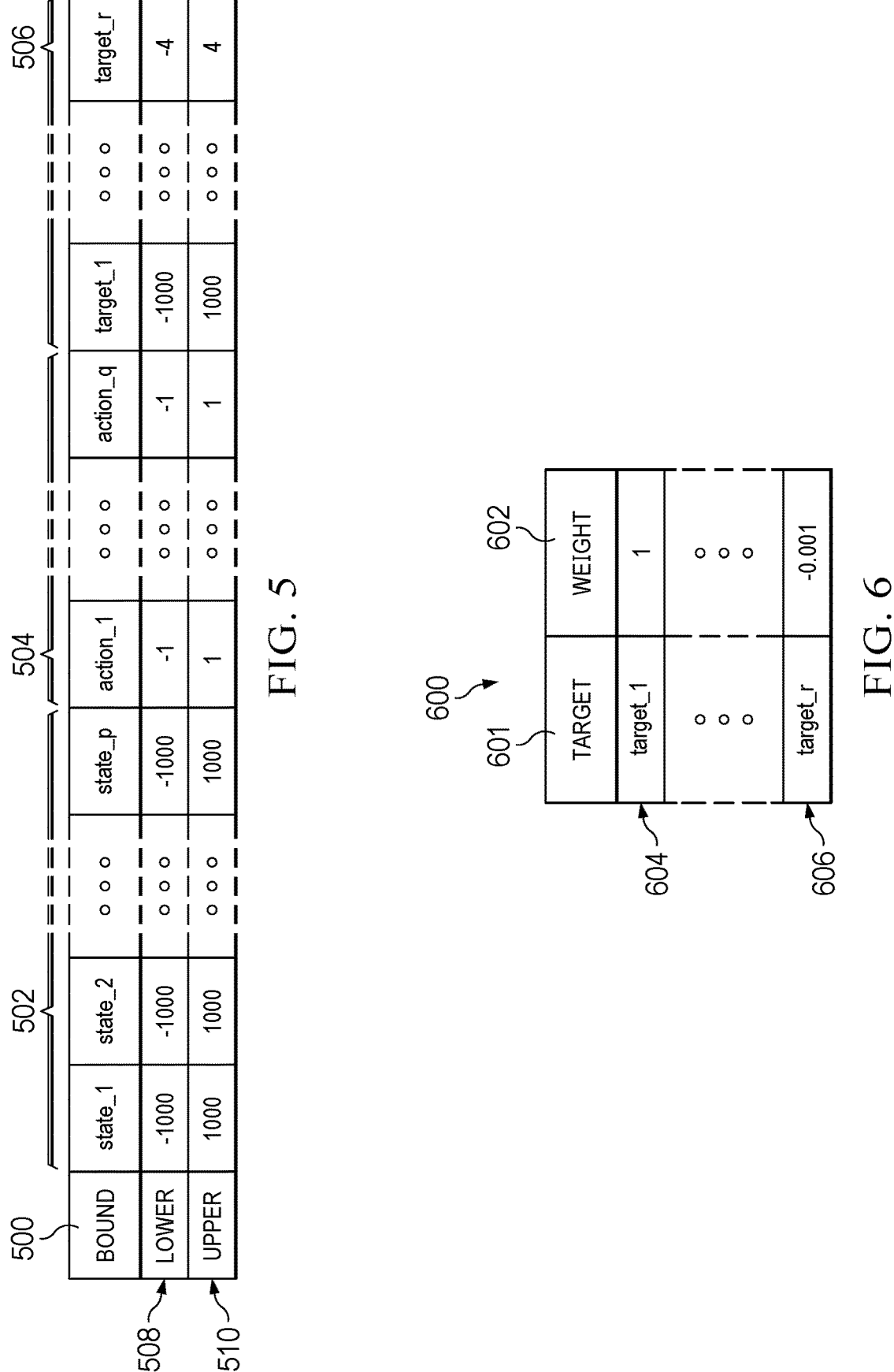
FIG. 5 is an illustration of tabular information for automating an optimization process in accordance with an illustrative embodiment.
FIG. 6 is an illustration of tabular information of automating an optimization process in accordance with an illustrative embodiment.

With reference next to FIG. 5, an illustration of tabular information for automating an optimization process is depicted in accordance with an illustrative embodiment. In this illustrative example, table 500 defines bounds for different types of variables used in automatically creating an optimization model, such as optimization model 220 in FIG. 2.

As depicted, in table 500, columns 502 defined bounds for state variables and columns 504 define bounds for input variables. Further, columns 506 define bounds for target variables. In this example, row 508 contains lower bounds while row 510 contains upper bounds for these different variables. These bounds are examples of bounds 333 in FIG. 3. The different bounds in table 500 can be used to define input constraints and target constraints in constraints 240 in optimization model 220 in FIG. 2 and FIG. 3.

Next in FIG. 6, another illustration of tabular information of automating an optimization process is depicted in accordance with an illustrative embodiment. In this example, table 600 defines weights for target variables. These weights are examples of weights 334 in FIG. 3.

In table 600, target column 601 defines the target variable and weight: 602 defines the wait for the target variable. In this example, target_1 in row 604 has a weight of 1. This positive value for the weight indicates that this target variable should be maximized. As depicted, target_r 606 has a weight of –0.001. This negative value indicates that this target variable should be minimized. Further, the value of the weights can be used to provide a relative importance in finding an extremum for these variables.

Although these weights have been described for target variables, weights can also be assigned to other variables that are to be maximized or minimized such as state variables and control actions.

Figure 7:
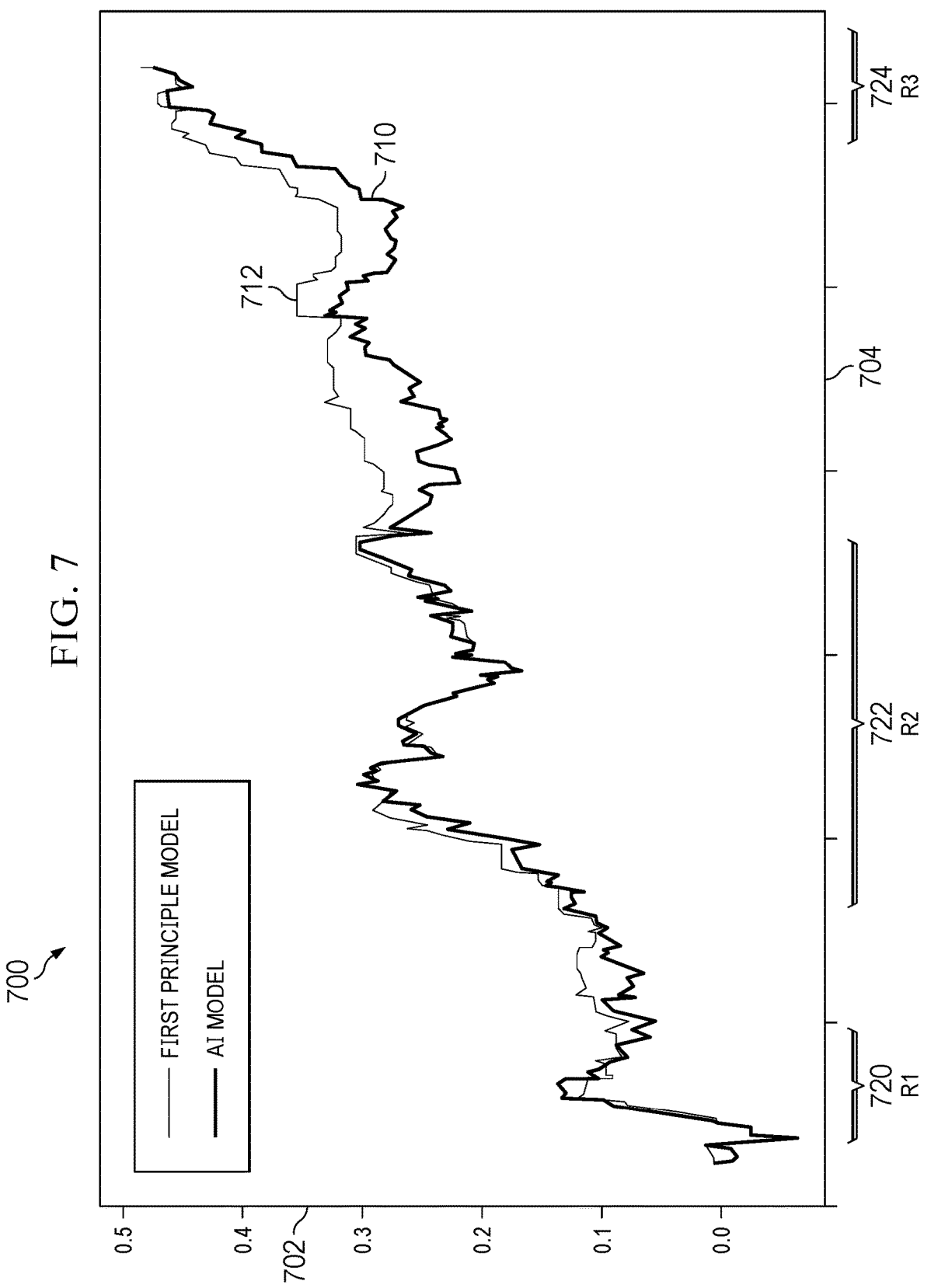
FIG. 7 is an illustration of regions of agreement between a machine learning model and a first principle model in accordance with an illustrative embodiment.

Turning to FIG. 7, an illustration of regions of agreement between a machine learning model and a first principle model is depicted in accordance with an illustrative embodiment. In this illustrative example, graph 700 illustrates the prediction of target values for set points at future points in time. As depicted, y-axis 702 is the target values for a target variable and x-axis 704 is the set points for an input variable. For example, the target variable can be throughput and the input variable can be temperature.

As depicted, line 710 illustrates the output predicted by a machine learning model for various set points. Line 712 represents the output predicted by a first principle model. In this illustrative example, region R1 720, region R2 722, and region R3 724 are regions where target values predicted by these two models are in agreement. In this illustrative example, the target values are in agreement when the difference between the target values predicted by the machine learning model and the first principle model are within some threshold or error level.

In this illustrative example, these regions define ranges of set points that can be considered in the optimization process to select set points for an optimization solution. These regions can be considered constraints defining set points that can form the set points in an optimization solution.

Machine learning model such as regression models can be uncertain from training using data concentrated in certain regions of the action space. As a result, the solution of the nonlinear optimization problem using an optimization model made saturate around the bounds of the action space, which might in turn lead to undesired rapid changes for certain set points. In other words, the machine learning model may not predict target values for target variable as precisely as desired for some ranges of set points based on the data used in training machine learning model.

The first principle model can accurately capture the relationship between variables such as input variables, state variables, and a target variable. For example, values for input variables and state variables can be input into the first principle model to obtain a target value for the target variable.

The target values for the target variable generated by the first principle model using these inputs can be compared to the prediction of the target values for the target variable by the machine learning model to determine whether agreement is present between the target values output by these models for target variable.

Thus, illustrative examples these models to identify regions in which the predictions of target values in response to an input for an input variable can be used to define candidate set points that can be used in an optimization process to identify set points for an optimization solution. In this illustrative example, graph 700 is provided as a simplified example to illustrate the agreement between target values predicted for target variable in response to values for input variable and not meant to limit the manner in which other illustrative examples can be implemented. In other illustrative examples, these regions are determined for potential set points for multiple input variables.

Figure 8:
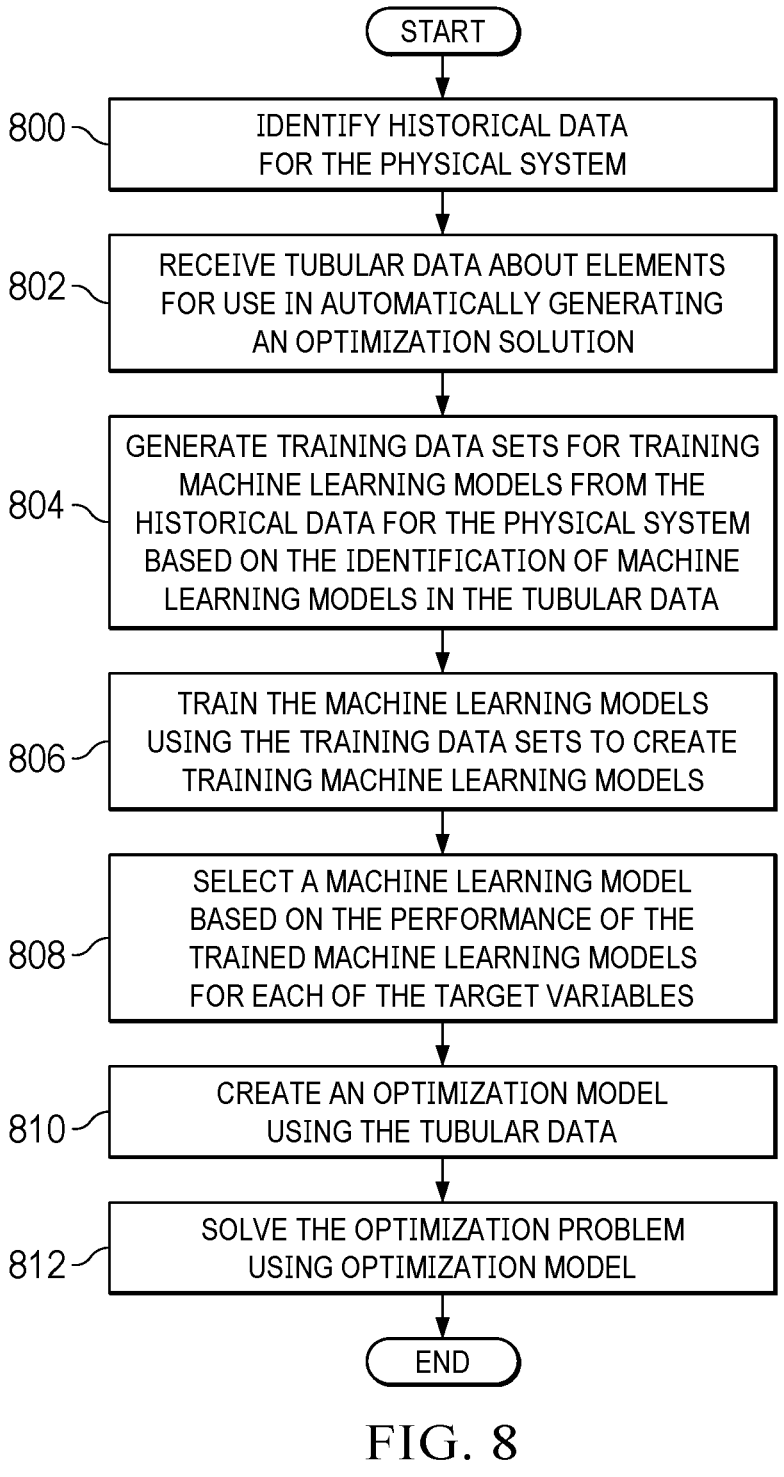
FIG. 8 is a flowchart of process for generating an optimization solution to control a physical system in accordance with an illustrative embodiment.

Turning to FIG. 8, a flowchart of process for generating an optimization solution to control a physical system is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in optimizer 214 in computer system 212 in FIG. 2. This process can be an automatic process based on selections of elements for the optimization solution.

The process begins by identifying historical data for the physical system (step 800). This historical data can be in different formats such as tubular data and time series data. In this example, tubular data is data in data structure where the data can be arranged in a table or matrix-like format. With tubular data, rows represent individual observations for variables such as input variables, state variables, and target variables.

The process receives tubular data about elements for use in automatically generating an optimization solution (step 802). In step 802, these elements can include, for example, an identification of control variables, state variables, target variables, machine learning models, bounds for variables, or weights.

The process generates training datasets for training machine learning models from the historical data for the physical system based on the identification of machine learning models in the tubular data (step 804). In step 804, the training datasets comprise data from the historical data selected based on input variables and target variables identified in the tubular data. In one illustrative example, a machine learning model is selected for each target variable.

The process trains the machine learning models using the training datasets to create training machine learning models (step 806). In this example, a group of machine learning models can be trained for each target variable identified in the tubular data. The process selects a machine learning model based on the performance of the trained machine learning models for each of the target variables (step 808).

The process creates an optimization model using the tubular data (step 810). In step 810, the optimization model includes an objective function in which target variables are to be optimized. The type of optimization can be determined based on the weights in the tubular data for the target variables. Further, constraints for input variables and target variables can also be identified from bounds in the tubular data. A model constraint can also be selected based on the relationship between the set points and output in the machine learning model selected for each target variable. In other words, a model constraint can be present for each target variable that is different from the model constraints for other target variables. Further, in creating the optimization model, the process identifies regions in which an agreement is present between the machine learning model and the first principle model for each of the target variables.

The process solves the optimization problem using the optimization model (step 812). The process terminates thereafter. In step 812, the result is set points that form an optimization solution. This optimization solution can be used to perform control actions to control the operation of the physical system. The control actions can adjust one or more input variables for the physical system such that target values can be reached for the target variables selected for control in the physical system.

Turning next to FIG. 9, a flowchart of a process for determining an optimization solution for physical system is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in optimizer 214 in computer system 212 in FIG. 2.

The process begins by forming an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system (step 900). In step 900, the machine learning model can be selected from a group comprising a regression model, a random forest model, a recurrent neural network, a multi-layer perceptron with a rectified linear unit (ReLU), and other suitable types of machine learning models.

The process determines set points for the input variables for an extremum for the target value for the target variable in the optimization model using a number of regions in which the set points result in agreement between the target value predicted by the machine learning model and the target value predicted by the first principle model, wherein the set points form an optimization solution for controlling the physical system (step 902). The process terminates thereafter. The extremum for the target value of the target variable can be selected from one of a minimum and a maximum.

The optimization solution can be used to perform control actions on the physical system. These control actions can specify changes to inputs based on the set points in the optimization solution. Further, in some illustrative examples, additional target variables may be present. The optimization model can be formed taking these additional target variables into account such that the optimization model can optimize multiple target variables.

Reference now to FIG. 10, a flowchart of a process for forming an optimization solution is depicted in accordance with an illustrative embodiment. The process in this figure is an additional step that can be formed with the process in FIG. 9.

The process sets an input constraint on an input in the inputs, a target constraint on the target value, and a model constraint based on a relationship between the inputs and the target value for the target variable output using the machine learning model (step 1000). The process terminates thereafter.

In FIG. 11, a flowchart of a process for training a machine learning model is depicted in accordance with an illustrative embodiment. The process in FIG. 11 is an example of additional steps that can be performed with the steps in FIG. 9 to train a machine learning model.

The process begins by receiving a selection of the input variables, the target variable to be modeled, and the model types for machine learning models (step 1100). In step 1100, the selection of the input variables, the target variable to be modeled, and the model types for the machine learning models can be received as a tabular input. Additionally, the selection can further include normalization parameters and a time lag.

The process automatically creates training datasets from historical data for the physical system for training the machine learning models using the selection of the input variables and the target variable (step 1102). The process automatically trains the machine learning models using the training datasets to create trained machine learning models that predict the target values for the target variable in response to the inputs for the input variables (step 1104).

The process selects the machine learning model from the trained machine learning models based on a performance of the trained machine learning models in predicting the target values for the target variable (step 1106). The process terminates thereafter. When more than one target variable is present for optimization in the optimization problem, this process can be repeated for each target variable. In other illustrative examples, a single machine learning model can be trained rather than train multiple machine learning models in selecting one machine learning model based on performance.

Turning now to FIG. 12, a flowchart of a process for forming an optimization model is depicted in accordance with an illustrative event. This flowchart is an example of an implementation for step 900 in FIG. 9 in which more than one target variable is present for optimization.

The process forms the optimization model using the objective function; the machine learning model that predicts the target value for the target variable for the physical system; a set of additional machine learning models in which each of the set of additional machine learning models predicts a particular target value in a set of additional target values for a particular target variable in the additional target variables for the physical system in response to receiving inputs for the input variables for the physical system; the first principle model that predicts the target value for the target variable for the physical system; and a set of additional first principle models in which each of the set of first principle models predicts the particular target value in the set of additional target values for the particular target variable in the set of additional target variables for the physical system in response to receiving the inputs for the input variables for the physical system (step 1200). The process terminates thereafter.

Next in FIG. 13, a flowchart of a process for determining set points is depicted in accordance with an illustrative embodiment. The process in FIG. 13 is an example of an implementation for step 902 in which multiple target variable are present and multiple machine learning models and first principle models are used in determining the set points.

The process determines the set points for the input variables for the extremum for the target value for the target variable in the optimization model using a number of regions in which the set points result in agreement between the target value predicted by the machine learning model and the target value predicted by the first principle model and for a set of extremum for the set of additional target values for the set of additional target variables in the optimization model using additional regions in which the set points result in agreement between the set of additional target values predicted by the set of machine learning models and the target values predicted by the set of additional first principle models, wherein the set points form an optimization solution for controlling the physical system (step 1300). The process terminates thereafter.

In step 1300, a machine learning model and a first principle model is present for each target variable. In this illustrative example, the same target variable can be present twice with different time lags. In this case, a machine learning model and a first principle model is used for the target variable with the first time lag and another machine learning model and another first principle model is used for the target variable with the second time lag.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
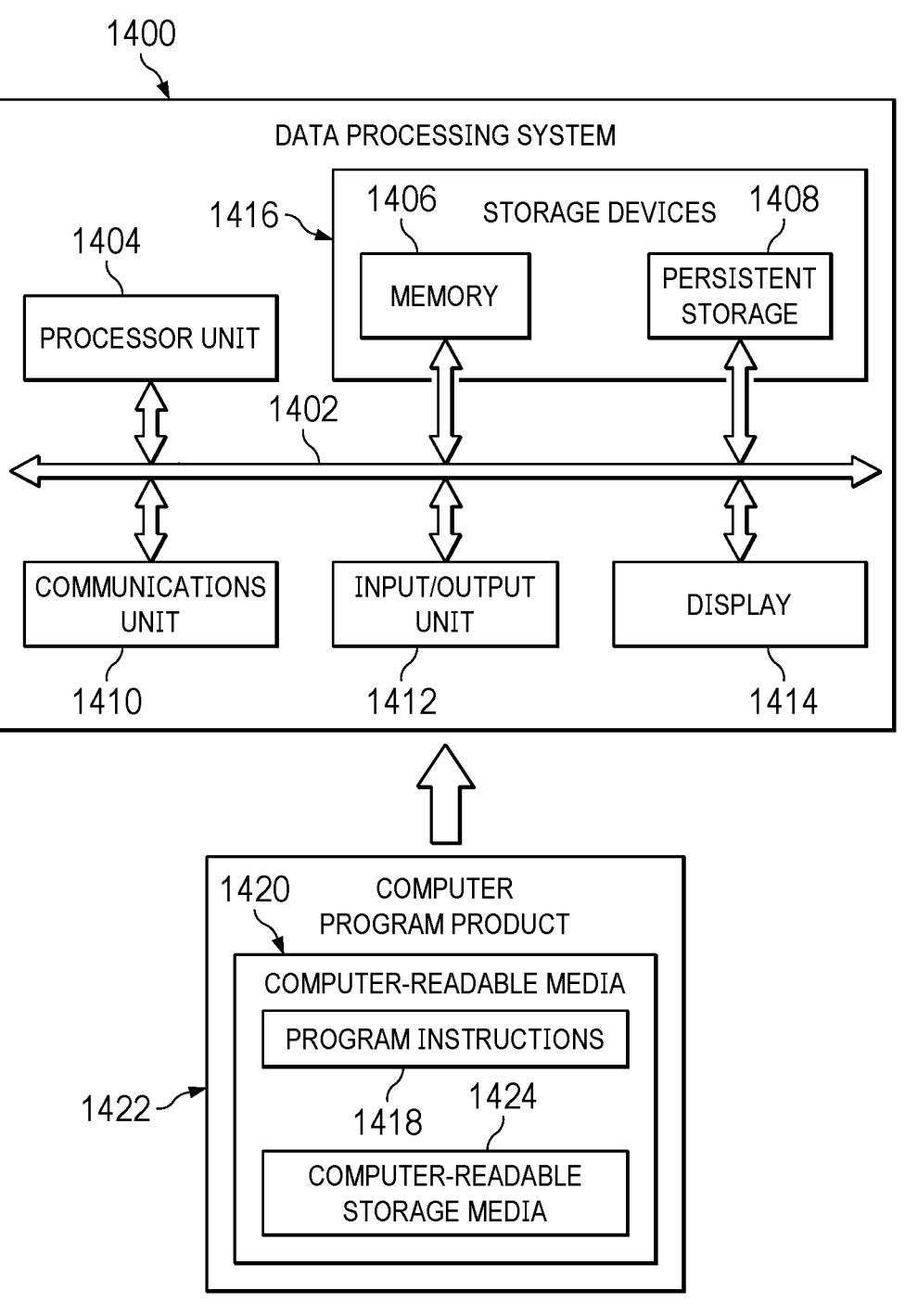
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement computers and computing devices in computing environment 100 in FIG. 1. Data processing system 1400 can also be used to implement computer system 212 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer readable program instructions that can be read and executed by a processor in processor unit 1404. The program instructions in the different embodiments can be embodied on different physical or computer readable storage media, such as memory 1406 or persistent storage 1408.

Program instructions 1418 are located in a functional form on computer readable media 1420 that is selectively removable and can be loaded onto or transferred to data processing system 1400 for execution by processor unit 1404. Program instructions 1418 and computer readable media 1420 form computer program product 1422 in these illustrative examples. In the illustrative example, computer readable media 1420 is computer readable storage media 1424.

Computer readable storage media 1424 is a physical or tangible storage device used to store program instructions 1418 rather than a medium that propagates or transmits program instructions 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer readable signal media. The computer readable signal media are signals and can be, for example, a propagated data signal containing program instructions 1418. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1420" can be singular or plural. For example, program instructions 1418 can be located in computer readable media 1420 in the form of a single storage device or system. In another example, program instructions 1418 can be located in computer readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer readable media 1420 in a server computer while another portion of program instructions 1418 can be located in computer readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments of the present invention provide a computer implemented method, computer system, and computer program product for determining an optimization solution for use in controlling a physical system. A number of processor units form an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system. The number of processor units determines set points for the input variables for an extremum for the target value for the target variable in the optimization model using a number of regions in which the set points result in agreement between the target value predicted by the machine learning model and the target value predicted by the first principle model. The set points form an optimization solution for controlling the physical system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method comprising:

forming, by a number of processor units, an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system; and determining, by the number of processor units, set points for the input variables for an extremum for the target value for the target variable in the optimization model using a number of regions in which the set points result in agreement between the target value predicted by the machine learning model and the target value predicted by the first principle model, wherein the set points are values for the input variables that results in the target variable to have the target value that is optimized to form an optimization solution for controlling the physical system, and wherein the number of regions are constraints to the set points selected in the optimization model for forming the optimization solution, and wherein the target values are in agreement when the difference between the target values predicted by the machine learning model and the first principle model are within a pre-defined threshold.

2. The computer implemented method of claim 1, wherein the set of constraints are selected from at least one of an input constraint on an input in the inputs, a target constraint on the target value, and a model constraint based on a relationship between the inputs and the target value for the target variable output using the machine learning model.

3. The computer implemented method of claim 1 further comprising:

receiving, by the number of processor units, a selection of the input variables, the target variable to be modeled, and the model types for machine learning models;

automatically creating, by the number of processor units, training datasets from historical data for the physical system for training the machine learning models using the selection of the input variables and the target variable;

automatically training, by the number of processor units, the machine learning models using the training datasets to create trained machine learning models that predict the target values for the target variable in response to the inputs for the input variables; and selecting, by the number of processor units, the machine learning model from the trained machine learning models based on a performance of the trained machine learning models in predicting the target values for the target variable.

4. The computer implemented method of claim 3, wherein the selection of the input variables, the target variable to be modeled, and the model types for the machine learning models is received as a tabular input.

5. The computer implemented method of claim 3, wherein the selection further includes normalization parameters and a time lag.

6. The computer implemented method of claim 1, wherein the extremum for the target value of target variable is selected from one of a minimum and a maximum.

7. The computer implemented method of claim 1, wherein the machine learning model is selected from a group comprising a regression model, a random forest model, a recurrent neural network, and a multilayer perceptron with a rectified linear unit (ReLU).

8. The computer implemented method of claim 1, wherein the forming, by the number of processor units, the optimization model further comprises:

forming, by the number of processor units, the optimization model using the objective function, a set of constraints; the machine learning model that predicts the target value for the target variable for the physical system; a set of additional machine learning models in which each of the set of additional machine learning models predicts a particular target value in a set of additional target values for a particular target variable in the set of additional target variables for the physical system in response to receiving inputs for the input variables for the physical system; the first principle model that predicts the target value for the target variable for the physical system; and a set of additional first principle models in which each of the set of first principle models predicts the particular target value in the set of additional target values for the particular target variable in the set of additional target variables for the physical system in response to receiving the inputs for the input variables for the physical system; and wherein the determining, by the number of processor units, the set points further comprises:

determining, by the number of processor units, the set points for the input variables for the extremum for the target value for the target variable in the optimization model using a number of regions in which the set points result in agreement between the target value predicted by the machine learning model and the target value predicted by the first principle model and for a set of extremum for the set of additional target values for the set of additional target variables in the optimization model using additional regions in which the set points result in agreement between the set of additional target values predicted by the set of machine learning models and the target values predicted by the set of additional first principle models, wherein the set points form an optimization solution for controlling the physical system.

9. A computer system comprising:

a number of processor units, wherein the number of processor units executes program instructions to:

form an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system; and determine set points for the input variables for an extremum for the target value for the target variable in the optimization model using a number of regions in which the set points result in agreement between the target value predicted by the machine learning model and the target value predicted by the first principle model, wherein the set points are values for the input variables that results in the target variable to have the target value that is optimized to form an optimization solution for controlling the physical system, and wherein the number of regions are constraints to the set points selected in the optimization model for forming the optimization solution, and wherein the target values are in agreement when the difference between the target values predicted by the machine learning model and the first principle model are within a pre-defined threshold.

10. The computer system of claim 9, wherein the set of constraints are selected from at least one of an input constraint on an input in the inputs, a target constraint on the target value, and a model constraint based on a relationship between the inputs and the target value for the target variable output using the machine learning model.

11. The computer system of claim 9, wherein the number of processor units further executes program instructions to:

receive a selection of the input variables, the target variable to be modeled, and the model types for machine learning models;

automatically create training datasets from historical data for the physical system for training the machine learning models using the selection of the input variables and the target variable;

automatically train the machine learning models using the training datasets to create trained machine learning models that predict the target values for the target variable in response to the inputs for the input variables; and select the machine learning model from the trained machine learning models based on a performance of the trained machine learning models in predicting the target values for the target variable.

12. The computer system of claim 11, wherein the selection of the input variables, the target variable to be modeled, the model types for the machine learning models is received as a tabular input.

13. The computer system of claim 11, wherein the selection further includes normalization parameters and a time lag.

14. The computer system of claim 9, wherein the extremum for the target value of target variable is selected from one of a minimum and a maximum.

15. The computer system of claim 9, wherein the machine learning model is selected from a group comprising a regression model, a random forest model, a recurrent neural network, and a multilayer perceptron with a rectified linear unit (ReLU).

16. The computer system of claim 9, wherein in forming the optimization model, the number of processor units further executes program instructions to:

form the optimization model using the objective function, a set of constraints; the machine learning model that predicts the target value for the target variable for the physical system; a set of additional machine learning models in which each of the set of additional machine learning models predicts a particular target value in a set of additional target values for a particular target variable in the set of additional target variables for the physical system in response to receiving inputs for the input variables for the physical system; the first principle model that predicts the target value for the target variable for the physical system; and a set of additional first principle models in which each of the set of first principle models predicts the particular target value in the set of additional target values for the particular target variable in the set of additional target variables for the physical system in response to receiving the inputs for the input variables for the physical system; and wherein in determining the set points, the number of processor units further executes program instructions to:

determine the set points for the input variables for the extremum for the target value for the target variable in the optimization model using a number of regions in which the set points result in agreement between the target value predicted by the machine learning model and the target value predicted by the first principle model and for a set of extremum for the set of additional target values for the set of additional target variables in the optimization model using additional regions in which the set points result in agreement between the set of additional target values predicted by the set of machine learning models and the target values predicted by the set of additional first principle models, wherein the set points form an optimization solution for controlling the physical system.

17. A computer program product comprising a computer readable storage medium having program instructions embodied therewith, the program instructions executable by a computer system to cause the computer system to:

form an optimization model using an objective function, a set of constraints, a machine learning model that predicts a target value for a target variable for a physical system in response to receiving inputs for input variables for the physical system, and a first principle model that predicts the target value for the target variable for the physical system in response to receiving the inputs for the input variables for the physical system; and determine set points for the input variables for an extremum for the target value for the target variable in the optimization model using a number of regions in which the set points result in agreement between the target value predicted by the machine learning model and the target value predicted by the first principle model, wherein the set points are values for the input variables that results in the target variable to have the target value that is optimized to form an optimization solution for controlling the physical system, and wherein the number of regions are constraints to the set points selected in the optimization model for forming the optimization solution, and wherein the target values are in agreement when the difference between the target values predicted by the machine learning model and the first principle model are within a pre-defined threshold.

18. The computer program product of claim 17, wherein the set of constraints are selected from at least one of an input constraint on an input in the inputs, a target constraint on the target value, and a model constraint based on a relationship between the inputs and the target value for the target variable output using the machine learning model.

19. The computer program product of claim 17, wherein the program instructions are further executable by a computer system to cause the computer system to:

receive a selection of the input variables, the target variable to be modeled, and the model types for machine learning models;

automatically create training datasets from historical data for the physical system for training the machine learning models using the selection of the input variables and the target variable;

automatically train the machine learning models using the training datasets to create trained machine learning models that predict the target values for the target variable in response to the inputs for the input variables; and select the machine learning model from the trained machine learning models based on a performance of the trained machine learning models in predicting the target value for the target variable.

20. The computer program product of claim 19, wherein the selection of the input variables, the target variable to be modeled, the model types for the machine learning models is received as a tabular input.

* * * * *